United States Patent [19]

Davidovits et al.

[11] Patent Number: 4,509,985

[45] Date of Patent: Apr. 9, 1985

[54] EARLY HIGH-STRENGTH MINERAL POLYMER

[75] Inventors: Joseph Davidovits, Saint-Quentin, France; James L. Sawyer, Friendswood, Tex.

[73] Assignee: Pyrament Inc., Houston, Tex.

[21] Appl. No.: 582,279

[22] Filed: Feb. 22, 1984

[51] Int. Cl.$^3$ ............................................. C04B 19/04
[52] U.S. Cl. ...................................... 106/84; 106/85; 106/117
[58] Field of Search ............................ 106/84, 85, 117

[56] References Cited

U.S. PATENT DOCUMENTS 4,349,386  9/1982  Davidovits .......................... 106/85

Primary Examiner—James Poer
Attorney, Agent, or Firm—McAulay, Fields, Fisher, Goldstein & Nissen

[57] ABSTRACT

An early high-strength mineral polymer composition is formed of a polysialatesiloxo material obtained by adding a reactant mixture consisting of alumino-silicate oxide ($Si_2O_5,Al_2O_2$) with the aluminum cation in a fourfold coordination, strong alkalis such as sodium hydroxide and/or potassium hydroxide, water, and a sodium/potassium polysilicate solution; and from 15 to 26 parts, by weight, based upon the reactive mixture of the polysialatesiloxo polymer of ground blast furnace slag. Sufficient hardening for demolding is obtained in about 1 hour with this composition.

6 Claims, No Drawings

EARLY HIGH-STRENGTH MINERAL POLYMER

BACKGROUND OF THE INVENTION

The present invention is directed to a mineral polymer composition which is employed for the making of cast or molded products at room temperatures, or temperatures generally up to 248° F., where the composition has attained sufficient strength to be demolded within 90 minutes of casting or molding. These high early-strength compositions are obtained by the blending of a mineral geopolymer, referred to as a polysialate, blast furnace slag, obtained from the making of iron in a blast furnace and possibly, an inert filler.

The mineral geopolymers are called polysialates, and have the following empirical formula:

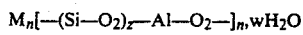

wherein "z" is 1, 2 or 3; "M" is a monovalent cation such as potassium or sodium, and "n" is the degree of polycondensation. Where "z" is 1, the mineral geopolymer has the formula:

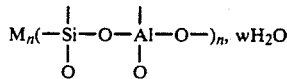

and is called polysialate or PS for short, and is of the K-PS polymer compound type when "M" is potassium. Where "z" is 2, the mineral geopolymer has the formula:

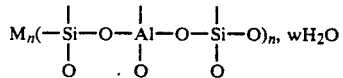

and is called polysialatesiloxo or PSS for short. When "M" is sodium or a mixture of sodium and potassium, the geopolymer is called (sodium, potassium)-polysialatesiloxo or NaKPSS. The chemical formula of NaKPSS may be written as:

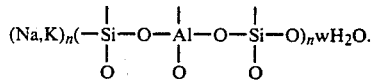

The method for making NaKPSS or KPS is described in U.S. Pat. No. 4,349,386 and U.S. application Ser. No. 377,204. It comprises preparing a sodium silico-aluminate/potassium silico-aluminate water mixture where the composition of the reactant mixture, in terms of oxide-mole ratios, falls within the ranges shown in Table A below.

TABLE A

| Oxide-Mole Ratios of the Reactant Mixture | |
|---|---|
| $M_2O/SiO_2$ | 0.20 to 0.48 |
| $SiO_2/Al_2O_3$ | 3.3 to 4.5 |
| $H_2O/M_2O$ | 10.0 to 25.0 |
| $M_2O/Al_2O_3$ | 0.8 to 1.6 | where $M_2O$ represents either $Na_2O$, or $K_2O$ or the mixture $(Na_2O,K_2O)$.

The usual method for preparing this mixture comprises dissolving in water an alumino-silicate oxide, alkali, and a colloidal silica sol or alkali polysilicate. The alumino-silicate oxide $(Si_2O_5,Al_2O_2)_n$ may be prepared from a polyhydroxy-alumino-silicate having the formula $(Si_2O_5,Al_2(OH)_4)_n$, where the aluminum cation is in the octahedral state and is in six-fold coordination. The polyhydroxy-alumino-silicate is calcined and dehydroxylated at, say 1112° F. to 1472° F. The resulting alumino-silicate oxide has the aluminum cation in four-fold coordination and in a tetrahedral position.

Various polyhydroxy-alumino-silicates may be used as the starting material for the preparation of alumino-silicate oxide, including minerals having basal spacings of about seven Angstroms and having at least one aluminum cation located in the octahedral layers. Examples are alushite, carnat, china clay, lithomarge, neokaolin, parakaolinite, pholenite, endellite, glossecolite, halloysite, milanite, berthiernine, fraignotite, grovenite, amesite, and chamoisite.

The quantities of the reactants, namely colloidal silica sol and/or polysilicate, and strong alkalis such as sodium hydroxide and potassium hydroxide, fall in the ranges shown in Table A.

After aging, the mineral mixture may be used alone, or may be mixed with inorganic or organic additives or fillers. The mixture may be used as a binder or a mineral cement for organic or mineral particles or fibers. The mixture is cast, poured or squeezed into a mold and heated to a temperature up to about 467° F. but preferably to a temperature in the range of about 140° F. to about 203° F. When polycondensation is complete, the solids are separated from the mold and dried at a temperature in the range of about 140° F. to about 212° F.

Polycondensation and heating times are a function of the temperature and the heating process used. At an ambient temperature such as 77° F., polycondensation requires more than 15 hours. At 122° F., polycondensation requires about four hours; at 185° F., about 1.5 hours; and at 203° F., about 0.5 hours. These times may differ and are often shorter when other heating techniques are used. Such other techniques include high frequency, microwave, Joule effect, or electrical wires within the reactant mixture itself. Because the reactant mixtures are polyelectrolytes, these heating techniques effect polycondensation and drying very rapidly.

There is a need for a cement which has the high setting and very low volume change characteristics normal for polysialate geopolymers, but which has very early high compressive strengths. This need is particularly acute in the prestress and precast concrete industry. Considerable savings result from the required strength being obtained at early ages so that construction can continue and there is a more rapid reuse of molds. There is also a need for such a very early high-strength cement having the high setting characteristics of polysialate geopolymers in patching or resurfacing highways and airport runways or in any operation where early form removal is desired.

While there have been proposals in the past for a cement having early high compressive strength, none of them have had the early compressive strengths required; that is, cement having a compressive strength better than 1,000 psi by 1 hour at 150° F. and 6,000 psi by 4 hours at 150° F. when tested in a standard 1 to 2.75 by weight cement-sand mortar, and having the high setting and very low volume change characteristics that are normal for, and are typical of, polysialate geopolymers.

The best early high-strength Portland Cement described in U.S. Pat. No. 4,160,674 is made from a Portland Cement having substantially all of its particles of about 20 microns and smaller. This fine and expensive cement type "Incor" had a compressive strength of 3,000 psi in 4 hours at a temperature of 150° F.

The second required component of the high early-strength composition of the present invention is a ground blast furnace slag. Part of the steel-making process is in the reduction of iron ore to pig iron in a blast furnace. A by-product of the iron-making operation is blast furnace slag, the material resulting from the purification of iron ore into pig iron. Blast furnace slags contain, in addition to the lime and magnesia added to the blast furnace as fluxing material, the impurities previously contained in the iron ore, usually silica, alumina, and minor amounts of other compounds.

The ground blast furnace slag employed is a latent hydraulic product which can be activated by suitable activators. Without an activation, the development of the strength of the slag is extremely slow. It is also known that the development of the slag necessitates a pH higher than or equal to 12. The best activators are then Portland Cement, clinker, $Ca(OH)_2$, NaOH, KOH, and waterglass. The 7 day compressive strengths of activated slags with different alkali activators are given in the paper presented by J. Metso and E. Kapans, "Activation of Blast Furnace Slag by Some Inorganic Materials", at the CANMET/ACI First International Conference on the Use of Fly Ash, Silica Fume, Slag and Other Mineral By-products in Concrete", July 31–August, 1983, Montebello, Quebec, Canada. An addition of 4% by weight of NaOH gave a compressive 7 day strength of 12 to 20 MPa (1740 to 2900 psi), and a compressive 28 day strength of 22 MPa (3190) psi.

The addition of ground blast furnace slag to the polysialate geopolymers accelerates the setting time, and improves compressive strength.

BRIEF DESCRIPTION OF THE INVENTION

The present invention is directed to a high early-strength mineral polymer composition, useful as a cement, which has very early high compressive strength; that is, compressive strength better than 1,000 psi by 1 hour at 150° F. and 6,000 psi by 4 hours at 150° F. when tested in a standard 1 to 2.75 by weight cement-sand mortar, and which has the high setting and very low volume change characteristics that are normal and typical of polysialate geopolymers.

This early high-strength cement composition is obtained by adding to a reactant mixture consisting of alumino-silicate oxide $(Si_2O_5,Al_2O_2)$ with the aluminum cation in four-fold coordination, strong alkalis such as sodium hydroxide and/or potassium hydroxide, water and a sodium/potassium polisilicate solution, a certain amount of ground blast furnace slag. To 100 g of a reactant mixture having the following oxide-mole ratio:

$M_2O/SiO_2$: 0.21 to 0.36
$SiO_2/Al_2O_3$: 3.0 to 4.12
$H_2O/M_2O$: 12 to 20
$M_2O/Al_2O_3$: 0.6 to 1.36 where $M_2O$ represents either $Na_2O$, or $K_2O$, or the mixture ($Na_2O$, $K_2O$), one adds 15 g to 26 g of a fine ground blast furnace slag.

Additional details of both the mineral geopolymers and its use as a cement for making cast or molded products are set forth in the description of the preferred embodiments.

Accordingly, it is an object of the present invention to provide a mineral binder of the polysialate type used as a cement, having a very early high compressive strength and having very low volume change characteristics that are normal for, and typical of, polysialate geopolymers. A further object of the present invention is the provision of such a very early high compressive strength with the use of fine ground blast furnace slag. A further object of the present invention is the provision of a mineral binder of the polysialate type $M_n[(Si-O_2)_z-AlO_2]_n,wH_2O$, wherein "z" is 1 or 2, where $M_2O$ represents either $Na_2O$, or $K_2O$ or the mixture $(Na_2O,K_2O)$.

Employing the compositions of the present invention, cast or molded bodies achieve sufficient strength to be demolded in approximately 1 hour.

Other and further objects, features and advantages of these mineral geopolymers, such as their uses as binders are apparent from this specification and claims.

DESCRIPTION OF THE PREFERRED EMBODIMENTS

The method for making NaKPSS or KPS geopolymers is described in U.S. Pat. No. 4,249,386 and U.S. application Ser. No. 377,204, filed Apr. 29, 1982. It comprises preparing a sodium silico-aluminate/potassium silico-aluminate water mixture where the composition of the reactant mixture, in terms of oxide-mole ratios, falls within the ranges shown in Table A below.

TABLE A

| Oxide-Mole Ratios of the Reactant Mixture | |
|---|---|
| $M_2O/SiO_2$ | 0.20 to 0.48 |
| $SiO_2/Al_2O_3$ | 3.3 to 4.5 |
| $H_2O/M_2O$ | 10.0 to 25.0 |
| $M_2O/Al_2O_3$ | 0.8 to 1.6 | where $M_2O$ represents either $Na_2O$, or $K_2O$ or the mixture $(Na_2O,K_2O)$. The mixture may be used as a binder or a mineral cement for organic particles or fibers. The mixture is cast, poured or squeezed into a mold and heated to a temperature up to about 467° F., but preferably to a temperature in the range of about 140° F. to about 203° F. When polycondensation is complete, the solids are separated from the mold and dried at a temperature in the range of about 140° F. to about 212° F.

Polycondensation and heating times are a function of the temperature and the heating process used. At an ambient temperature such as 77° F., polycondensation requires more than 15 hours. At 122° F., polycondensation requires about 4 hours; at 185° F., about 1.5 hours; and at 204° F., about 0.5 hours.

The following examples illustrate the methods of making the new early high-strength polysialate geopolymers of the NaKPSS or KPS types, and some of the properties of these cements as well.

EXAMPLE I (CONTROL)

We prepared 840 g of a reactant mixture containing 17.3 moles of water, 1.438 moles potassium oxide, 4.45 moles of silicon dioxide and 1.08 moles of aluminum trioxide. The source of aluminum trioxide is the alumino-silicate oxide $(Si_2O_5,Al_2O_2)_n$ with Al in four-fold coordination prepared by dehydroxylating a natural polyhydroxy-alumino-silicate $(Si_2O_5,Al_2(OH)_4)_n$ with Al in six-fold coordination. The source of silicon dioxide is this alumino-silicate oxide and a potassium silicate. The source of potassium oxide is this potassium silicate and potassium hydroxide. The oxide mole ratios in the reactant mixture are shown in Table B.

TABLE B

| | |
|---|---|
| $K_2O/SiO_2$ | 0.32 |
| $SiO_2/Al_2O_3$ | 4.12 |
| $H_2O/Al_2O_3$ | 17.0 |
| $K_2O/Al_2O_3$ | 1.33 |
| $H_2O/K_2O$ | 12.03 |

We call this reactant mixture standard mixture. To the 840 g of this standard mixture was added 20 g of fine mica, 110 g of fine calcium flouride and 220 g of fine clay kiln dust. This slurry, weighing 1190 g, was added to 2210 g of graded Ottawa sand, and the obtained mixture was cast into standard 2" cube molds, cured 4 hours at 150° F. The compressive strength after 4 hours at 150° F. is 6730 psi; other data are given in Table I. Table II gives all volume changes in water and in air. The low volume change in air of the standard mixture (+0.009) compared with current cement (Type I, Lone Star New Orleans) (−0.074), illustrates the great advantage of a geopolymer. However, the standard mixture begins to harden at 150° F. only after 2 hours, and may only be demolded after 4 hours. At ambient temperature (say 73° F.), hardening begins after 15 hours and demolding may occur only after 24 hours or better at 48 hours. At 185° F. hardening begins after 40 minutes and demolding occurs after 1 hour and 30 minutes. These hardening times are too long for numerous applications, especially when no heat may be applied, or when the molds and tooling costs are so high that an increase in productivity becomes a necessity.

EXAMPLE II

To the 840 g of the standard mixture of Example I, are added 20 g of fine mica, 110 g of calcium flouride and 220 g of Lone Star Miami ground sidmar slag which has the following characteristics:

| MIAMI PLANT GROUND SIDMAR SLAG | |
|---|---|
| Glass, % Microscope | 70 |
| $SiO_2$ | 32.83 |
| $Al_2O_3$ | 11.59 |
| $Fe_2O_3$ | 1.58 |
| CaO | 41.43 |
| MgO | 8.03 |
| $TiO_2$ | 0.55 |
| $Na_2O$ | 0.28 |
| $K_2O$ | 0.41 |
| SrO | 0.06 |
| $SO_3$ | 0.42 |
| S | 0.99 |
| Gain on Ignition | 0.86 |
| Corrected Loss | 1.12 |
| Hydraulic Index | |
| I | 1.86 |
| $I_H$ | 1.80 |

This slurry of Example II, weighing 1190 g, was added to 2200 g of graded Ottawa sand, and the obtained mixture cast into standard 2" cube molds. This mixture begins to harden after 21 minutes at 73° F. The compressive strength after 24 hours at 73° F. is 5575 psi. Cured 4 hours at 150° F., the compressive strength is 7140 psi (see Table I), and reaches 8220 psi after 1 day at 73° F., the shrinkage in air (Table II) remains low—0.021.

EXAMPLE III

To the 840 g of the standard mixture of Example I, are added 220 g of a fine ground, light weight expanded clay aggregate (used as an inert filler), and 130 g of the Miami ground sidmar slag as in Example II. This slurry of Example III, weighing 1190 g, is added to 220 g of graded Ottawa sand. The mixture begins to harden after 45 minutes at 73° F. Compressive strength on 2" cubes cured 4 hours at 150° F. (Table I), is 8350 psi and reaches 8770 psi after 1 day at 73° F. The shrinkage in air (Table II), remains low at 0.015 compared with 0.074 for regular Portland Cement. It is also of interest to note that with this geopolymer mixture of Example III, the compressive strength on 2" cubes, cured 24 hours at 150° F. reaches 10,000 psi.

Table I gives the compressive strength comparison on 2" cubes for the geopolymer standard mixture of Example I, the geopolymer mixture of Example III, cements of Lone Star Industries Type I, Type III, Super Incor and Reg. Set II Cement, cured 4 hours at 150° F. or at room temperature.

Table II gives the volume change in water or in air after 2 months. Geopolymer mixture shows higher expansion in water than Portland Cement, but the very low shrinkage in air is a very important property.

TABLE I

COMPRESSIVE STRENGTH COMPARISON, 2" CUBES, PSI

| | 150° F. for 4 hours | | | | |
|---|---|---|---|---|---|
| | Geopolymer Example I | Geopolymer Example III | Type I (N.O.) Portland Cement | Super Incor Cement | Reg. Set II Cement |
| 4 hours | 6730 | 8350 | 260 | 3000 | 2200 |
| 1 day | 6400 | 8770 | 2130 | 8150 | 3600 |
| 7 days | 7050 | 8500 | 4500 | 8620 | 4400 |
| 28 days | 6900 | 9000 | 7200 | 9720 | 5200 |

| | No Heat Curing | | | | | |
|---|---|---|---|---|---|---|
| | Geopolymer Standard Mixture Example I | Geopolymer Example II | Type I Cement (Miami) | Type III Cement (Greencastle) | Super Incor Cement | Reg. Set II Cement |
| 4 hours | — | 3500 | — | — | 2000 | 1800 |
| 1 day | 2000 | 7920 | 2000 | 4500 | 6600 | 3800 |
| 7 days | 4500 | 8200 | 5000 | 6500 | 8600 | 4700 |
| 28 days | 7000 | 9000 | 7100 | 7100 | 9000 | 6200 |

TABLE II

| MIX | VOLUME CHANGE IN WATER 2 MONTHS | IN 50% R.H. AIR 2 MONTHS |
|---|---|---|
| Geopolymer Standard Example I | +.062 | +.009 |
| Geopolymer Example II | +.049 | −.021 |
| Geopolymer Example III | +.053 | −.015 |
| Type I Portland Cement | +.006 | −.074 |

EXAMPLE IV

We prepared 800 g of a reactant mixture containing 16.7 moles of water, 1.294 moles potassium oxide, 4.22 moles of silicon dioxide and 1.08 moles of aluminum trioxide. The source of the reactants is the same as in Example I. The oxide mole ratios in the reactant mixture are shown in Table C.

TABLE C

| $K_2O/SiO_2$ | 0.36 |
|---|---|
| $SiO_2/Al_2O_3$ | 3.90 |
| $H_2O/Al_2O_3$ | 15.48 |
| $K_2O/Al_2O_3$ | 1.198 |
| $H_2O/K_2O$ | 12.90 |

To the 800 g of this reactant mixture, one adds 220 g of a fine ground, light weight, expanded clay aggregate (used as an inert filler), and 130 g of the Miami ground sidmar slag. This slurry of Example IV, weighing 1150 g, is added to 2200 g of graded Ottawa sand. Compressive strength on 2″ cubes cured 4 hours at 150° F. is 7250 psi, and after storage 7 days at 73° F., 8470 psi. Compressive strength of 2″ cubes cured 2 days at room temperature (73° F.) is 6500 psi. The composition of this example began to harden, and could be demolded, after 60 minutes, at 73° F.

EXAMPLE V

We prepared 732 g of a reactant mixture containing 15.6 moles of water, 1.043 moles of potassium oxide, 3.88 moles of silicon dioxide and 1.08 moles of aluminum trioxide. The sources of the reactants are the same as in Example I. The oxide mole ratios in the reactant mixture are shown in Table D.

TABLE D

| $K_2O/SiO_2$ | 0.268 |
|---|---|
| $SiO_2/Al_2O_3$ | 3.592 |
| $H_2O/Al_2O_3$ | 14.44 |
| $K_2O/Al_2O_3$ | 0.96 |
| $H_2O/K_2O$ | 14.90 |

To the 782 g of this reactant mixture are added 220 g of a fine ground, light weight, expanded clay aggregate (used as an inert filler), and 130 g of the Miami ground sidmar slag. This slurry of Example V, weighing 1082 g, is added to 2200 g of graded Ottawa sand. Compressive strength on 2″ cubes, cured 4 hours at 150° F. is 7935 psi, and after storage for 7 days at 73° F., 8220 psi. Compressive strength of 2″ cubes cured 2 days at room temperature (73° F.), is 6650 psi. This composition began to harden, and could be demolded after about 45 minutes, at 73° F.

In the above Examples III, IV, and V, 130 g of the Miami ground sidmar slag was added to different geopolymer reactant mixtures. The reduction of the ratios $SiO_2/Al_2O_3$ and $K_2O/Al_2O_3$ has a slight influence on the compressive strength, as shown in Table III.

TABLE III

| Compressive strength on 2″ cubes cured 4 hours at 150° F. | | |
|---|---|---|
| $SiO_2/Al_2O_3$ | $K_2O/Al_2O_3$ | PSI |
| 4.12 | 1.33 | 8350 |
| 3.90 | 1.198 | 7250 |
| 3.592 | 0.96 | 7035 |

In Example II, 26% per weight of Miami slag was added to the geopolymer reactant mixture; in Example III, 15% of Miami slag; in Example IV, 16.2%; and in Example V, 17.7% by weight was added to the geopolymer reactant mixture.

In fact, another ratio seems to influence the compressive strength. In all above Examples III, IV, V, the $H_2O/K_2O$ increases, whereas the compressive strength is decreasing.

EXAMPLE VI

In order to study the influence of water on the compressive strength, we prepared 686 g of a geopolymer reactant containing 13.0 moles of water, 1.043 moles of potassium oxide, 3.88 moles of silicon dioxide and 1.08 moles of aluminum trioxide. The sources of the reactants are the same as in Example I. To the 686 g of this geopolymer reactant mixture are added 220 g of a fine ground, light weight expanded clay aggregate (used as an inert filler), and 130 g of the Miami ground sidmar slag. To this slurry of Example VI are added increasing amounts of water, and the obtained mixture is added to 2200 g of graded Ottawa sand. In Table IV is given the relationship between the ratio $H_2O/K_2O$ and the compressive strength for the reaction mixture according to this Example VI, which has the following oxide mole ratio:

$K_2O/SiO_2$: 0.268
$SiO_2/Al_2O_3$: 3.592
$K_2O/Al_2O_3$: 0.96

TABLE IV

| Compressive strength on 2″ cubes cured 4 hours at 150° F. Variation of water content. | | | | | | |
|---|---|---|---|---|---|---|
| $H_2O/K_2O$ | 12.46 | 14.90 | 16.45 | 17.52 | 18.85 | 20.80 |
| psi 4 days | 7235 | 7035 | 6000 | 4900 | 4220 | 3670 |
| psi 7 days at 73° F. | 8420 | 8220 | 6280 | 5480 | 4850 | 4100 |

The compositions of this example began to harden, and could be demolded at times varying from about 30 to about 70 minutes, at 73° F.

EXAMPLE VII

In order to demonstrate the major influence of this ratio $H_2O/K_2O$ (that is to say, the starting pH of the reactant mixture), we prepared 500 g of a geopolymer reactant mixture containing 8.69 moles of water, 0.719 moles of potassium oxide, 3.308 moles of silicon dioxide, and 1.08 moles of aluminum trioxide. The sources of the reactants are the same as in Example I. To the 500 g of this geopolymer reactant mixture are added 220 g of a fine ground, light weight, expanded clay aggregate (used as an inert filler), 130 g of the Miami ground sidmar slag, and 113 g of water. To this slurry of Example VII is added 2200 g of graded Ottawa sand. The oxide mole ratios of the geopolymer reactant mixture, with water, are shown in Table E:

TABLE E

| | |
|---|---|
| $K_2O/SiO_2$ | 0.217 |
| $SiO_2/Al_2O_3$ | 3.062 |
| $H_2O/Al_2O_3$ | 13.18 |
| $K_2O/Al_2O_3$ | 0.665 |
| $H_2O/K_2O$ | 20.80 |

Compressive strength of 2" cubes cured 4 hours at 150° F. is 3600 psi and when placed 7 days at room temperature (73° F.), 4000 psi. One obtains the same value with $H_2O/K_2O$ equal to 20.80, as in Table III; but in this Example VII, the ratio $K_2O/Al_2O_3$ is 0.665, instead of 0.96 as in Example VI. The most important element is then obviously the $H_2O/K_2O$ ratio, which determines the pH value of the reacting geopolymer mixture. A low ratio, in the range between 12 and 16 yields to high early compressive strength, whereas a big $H_2O/K_2O$ ratio, higher than 16, reduced substantially the mechanical properties of the geopolymer reactant mixture. Hardening of the composition of this example began in about 70 minutes, at 73° F.

EXAMPLE VIII

We prepared 870 g of a reactant mixture containing 20.0 moles of water, 0.724 moles of potassium oxide, 0.75 moles of sodium oxide, 4.45 moles of silicon dioxide and 1.08 moles of aluminum trioxide. The source of sodium oxide is sodium hydroxide. The sources of the other reactants are the same as in Example I. The oxide mole ratios in the reactant mixture are shown in Table F.

TABLE F

| | |
|---|---|
| $(K_2O,Na_2O)/SiO_2$ | 0.33 |
| $SiO_2/Al_2O_3$ | 3.592 |
| $H_2O/Al_2O_3$ | 18.6 |
| $[K_2O,Na_2O]/Al_2O_3$ | 1.36 |
| $H_2O/(K_2O,Na_2O)$ | 13.56 |

To the 870 g of this reactant mixture are added 220 g of a fine ground, light weight expanded clay aggregate (used as an inert filler), and 130 g of the Miami ground sidmar slag. This slurry of Example VII, weighing 1220 g, is added to 2200 g of graded Ottawa sand. Compressive strength on 2" cubes cured 4 hours at 150° F. is 6670 psi, and after storage for 7 days at 73° F., 7870 psi. Curing of the composition of this example began in about 70 minutes, at 73° F.

Compared with the results obtained in Example III, there is a slight reduction in strength from 8350 to 6670 psi (curing 4 hours at 150° F.), due to the replacement of 50% of the $K_2O$ by $Na_2O$. Sodium hydroxide is relatively cheaper than potassium hydroxide, and results in compressive strengths which are lower, but still interesting for various applications.

EXAMPLE IX

We prepared 781 g of a reactant mixture containing 18.2 moles of water, 1.043 moles of potassium oxide, 3.88 moles of silicon dioxide and 1.08 moles of aluminum trioxide. The sources of the reactants are the same as in Example I. The oxide mole ratios in the reactant mixture are shown in Table G.

TABLE G

| | |
|---|---|
| $K_2O/SiO_2$ | 0.268 |
| $SiO_2/Al_2O_3$ | 3.592 |
| $H_2O/Al_2O_3$ | 16.85 |
| $K_2O/Al_2O_3$ | 0.96 |
| $H_2O/K_2O$ | 17.25 |

To the 781 g of this reactant mixture are added 220 g of fine ground, light weight expanded clay aggregate (used as an inert filler), and 130 g of the Miami ground sidmar slag. This slurry of Example IV, weighing 1131 g, is added to 2200 g of graded Ottawa sand. The compressive strengths of 2" cubes cured at different temperatures and during different times are given in Table V.

TABLE V

Effect of Time and Temperature, Reactant Mixture Example IX, Compressive Strength on 2" Cubes

| Temperature | Curing Time | PSI | Stored 7 days at 73° F. (PSI) |
|---|---|---|---|
| 100° F. | 1 hour | 450 | 4780 |
| 100° F. | 4 hours | 2630 | 4620 |
| 150° F. | 1 hour | 1280 | 5500 |
| 150° F. | 2 hours | 3680 | 5480 |
| 150° F. | 4 hours | 4900 | 5480 |
| 200° F. | 1 hour | 4230 | 4780 |

Because of the relatively high $H_2O/K_2O$ ratio, the compressive strengths are lower than 6000 psi (cured 4 hours at 150° F.), but the 1 hour curing at 150° F. gives a compressive strength higher than 1000 psi, which is high enough for demolding. Hardening of this composition began in about 60 minutes, at 73° F.

The amount of slag added to the geopolymer reactant mixture varied in Examples III to VIII from 15.4% to 21% by weight. At the same time, the amount of water increases. Surprisingly, the increasing of water results in a reduction of the compressive strength, whereas, theoretically it is the opposite which might be expected. Indeed, increasing the water amount improves the dissolution of the slag. Table VI gives the variation of the compressive strength with the slag/water weight ratio of the reactant mixtures of Example VI.

TABLE VI

Compressive strength on 2" cubes, cured 4 hours at 150° F. Variation of the slag/water weight ratio, according to Example VI.

| Slag/Water | PSI |
|---|---|
| 0.55 | 7235 |
| 0.46 | 7035 |
| 0.42 | 6000 |
| 0.39 | 4900 |
| 0.36 | 4200 |
| 0.33 | 3670 |

The minimum of 6000 psi early high-strength is obtained with a slag/water weight ratio at least equal to 0.42; at room temperature the slag/water weight ratio determines the setting time.

Table VII gives the setting time at room temperature (73° F.) with the slag/water weight ratio.

TABLE VII

| Slag/water weight ratio | 0.70 | 0.55 | 0.46 | 0.42 |
|---|---|---|---|---|
| Setting time (73° F.) | 12 min. | 30 min. | 45 min. | 60 min. |

From the above described Examples, the present invention consists in the production of an early high-strength concrete composition, which is obtained by adding to a reactant mixture consisting of alumino-silicate oxide $(Si_2O_5,Al_2O_2)_n$ with the aluminum cation in four-fold coordination, strong alkalis such as sodium hydroxide and/or potassium hydroxide, water and a sodium/potassium polisilicate solution, a certain amount of ground blast furnace slag. To 100 g of a reactant mixture following oxide-mole ratio $M_2O/SiO_2$: 0.21 to 0.36
$SiO_2/Al_2O_3$: 3.0 to 4.12
$H_2O/M_2O$: 12.0 to 20
$M_2O/Al_2O_3$: 0.6 to 1.36 where $M_2O$ represents either $Na_2O$, or $K_2O$, or the mixture ($Na_2O,K_2O$), one adds 15 g to 26 g of a fine ground blast furnace slag. If more than 26 g of ground blast furnace slag is employed, the composition tends to "flash set". While it is more difficult to use, it can still be employed with higher amounts of slag. The 15 g to 26 g amounts of slag are based upon the reactive polysialate siloxo mixture, including water.

Tested in standard 1 to 2.75 by weight cement-sand mortar, the polysialate geopolymer/slag mixture used as a cement, yields to early high compressive strength; that is, compressive strength better than 1000 psi by 1 hour at 150° F. and 6000 psi by 4 hours at 150° F. Depending on the slag/water weight ratio, the setting time at room temperature varies from 12 minutes to 60 minutes with a slag/water weight ratio in the range of 0.70 to 0.42.

As plotted in Table II, the polysialate geopolymer/slag mixture yields to very low volume change characteristics that are normal and typical of polysialate geopolymers, such as a shrinkage in air after 2 months, as low as 0.015 compared with the value for regular Portland Cement (0.074).

The foregoing embodiments have been given for the purpose of disclosure and changes can be made therein which are within the spirit of the invention as defined by the scope of the appended claim.

What is claimed is:

1. An early high strength concrete composition obtained by adding ground blast furnace slag to a reactant mixture consisting of alumino-silicate oxide $(Si_2O_5,Al_2O_2)_n$ with the aluminum cation in four-fold coordination, strong alkalis selected from the group consisting of sodium hydroxide and potassium hydroxide, water and a member selected from the class consisting of sodium and potassium polisilicate solutions, said reactant mixture having the following oxide mole ratio:

$M_2O/SiO_2$: 0.20 to 0.36
$SiO_2/Al_2O_3$: 3.0 to 4.12
$H_2O/M_2O$: 12 to 20
$M_2O/Al_2O_3$: 0.6 to 1.36 where $M_2O$ represents a member selected from the class consisting of $Na_2O$, $K_2O$, and the mixture ($Na_2O,K_2O$).

2. An early high-strength concrete composition according to claim 1, where the amount of ground blast furnace slag is 15% to 26% by weight of the said reactant mixture.

3. An early high-strength concrete composition according to claim 2, where the slag/water ratio is higher than 0.42.

4. An early high-strength concrete composition according to claim 1, where the $H_2O/M_2O$ mole ratio is in the range of 12 to 16.

5. An early high-strength concrete composition according to claim 1, which has compressive strength better than 1000 psi by 1 hour at 150° F. and 6000 psi by 4 hours at 150° F. when tested in a standard 1 to 2.75 by weight cement-sand mortar.

6. An early high-strength concrete composition according to claim 5 where the shrinkage, in air, after two months is lower than 0.020.

* * * * *